(12) United States Patent
Pham

(10) Patent No.: US 8,767,579 B2
(45) Date of Patent: Jul. 1, 2014

(54) METHOD OF PCI AND CQI ESTIMATION IN CDMA SYSTEMS

(75) Inventor: Duong Pham, Mulgrave (AU)

(73) Assignee: NEC Corporation, Tokyo (JP)

( * ) Notice: Subject to any disclaimer, the term of this patent is extended or adjusted under 35 U.S.C. 154(b) by 215 days.

(21) Appl. No.: 13/383,544

(22) PCT Filed: Aug. 18, 2010

(86) PCT No.: PCT/JP2010/064317
§ 371 (c)(1),
(2), (4) Date: Jan. 11, 2012

(87) PCT Pub. No.: WO2011/024825
PCT Pub. Date: Mar. 3, 2011

(65) Prior Publication Data
US 2012/0120841 A1    May 17, 2012

(30) Foreign Application Priority Data
Aug. 25, 2009    (AU) ............................... 2009904046

(51) Int. Cl.
   *G01R 31/08*    (2006.01)
   *H04W 4/00*    (2009.01)

(52) U.S. Cl.
   USPC ........................................ 370/252; 370/329

(58) Field of Classification Search
   CPC ............................... H04L 47/10; H04W 28/04
   USPC ................................................. 370/252, 329
   See application file for complete search history.

(56) References Cited

U.S. PATENT DOCUMENTS

| 7,856,243 B2 * | 12/2010 | Gunnarsson et al. ......... 455/522 |
| 2002/0122381 A1 | 9/2002 | Wu et al. |

(Continued)

FOREIGN PATENT DOCUMENTS

| CN | 1625164 A | 6/2005 |
| CN | 101171817 A | 4/2008 |

(Continued)

OTHER PUBLICATIONS

"Introduction of TxAA extension for non-MIMO UEs", Nokia, Nokia Siemens Networks, 3GPP TSG-RAN WG1 Meeting #57, May 8, 2009, R1-092088, San Francisco, USA.

(Continued)

*Primary Examiner* — Mark Rinehart
*Assistant Examiner* — Angel Brockman
(74) *Attorney, Agent, or Firm* — Sughrue Mion, PLLC

(57) ABSTRACT

A method includes: receiving symbols from antenna(s); calculating average-channel estimates of the symbols over a measurement period; forming a channel matrix from the average-channel estimates; calculating a power ratio between a closed-loop mode and an open-loop mode for each PCI using the channel matrix; calculating RSCP value(s) and ISCP value(s) corresponding to the antenna(s); averaging the RSCP value(s) and ISCP value(s) over the antenna(s) to provide averaged RSCP and ISCP; calculating open-loop SINR from the averaged RSCP and ISCP; calculating SINR for stream(s) for each PCI from the power ratio and the open-loop SINR; determining TBS for a single stream from a single-stream-CQI table using calculated SINR; determining TBS for all streams from a dual-stream-CQI table using calculated SINR; comparing the TBS of the single stream and TBS of the dual stream to determine whether to select single stream or dual stream; and determining PCI and CQI for the stream(s).

6 Claims, 3 Drawing Sheets

(56) References Cited

U.S. PATENT DOCUMENTS

2005/0254563 A1* 11/2005 Arima ............................. 375/227
2008/0112517 A1* 5/2008 Parts et al. .................... 375/346
2008/0175194 A1* 7/2008 Blanz et al. ................... 370/329

FOREIGN PATENT DOCUMENTS

| CN | 101227444 A | 7/2008 |
|---|---|---|
| CN | 101507139 A | 8/2009 |
| CN | 101610527 A | 12/2009 |
| WO | WO 2008/022243 A2 | 2/2008 |
| WO | WO 2008/086374 A1 | 7/2008 |

OTHER PUBLICATIONS

Communication dated Dec. 3, 2013, issued by the State Intellectual Property Office of the People's Republic of China in corresponding Application No. 201080034307.3.

* cited by examiner

METHOD OF PCI AND CQI ESTIMATION IN CDMA SYSTEMS

CROSS REFERENCE TO RELATED APPLICATIONS

This application is a National Stage of International Application No. PCT/JP2010/064317 filed Aug. 18, 2010, claiming priority based on Australian Patent Application No. 2009904046, filed Aug. 25, 2009, the contents of all of which are incorporated herein by reference in their entirety.

This application is based upon and claims the benefit of priority from Australian Provisional Patent Application 2009904046, filed on Aug. 25, 2009, the disclosure of which is incorporated herein in its entirety by reference.

TECHNICAL FIELD

The present invention relates to wireless communications systems, and more particularly to a method of Precoding Control Indicator (PCI) and Channel Quality Indicator (CQI) estimation in Code Division Multiple Access (CDMA) systems, and in particular, Multiple Input Multiple Output (MIMO) CDMA systems.

BACKGROUND ART

In MIMO CDMA systems it is desirable to estimate PCI and CQI since these parameters have an effect on throughput of the system.

It would therefore be desirable to provide a simple and effective method of estimating SINR, PCI and CQI. It would further be describable to provide a SINR calculation method which can be used for all transmission modes (e.g. MIMO, SISO etc)

It will be appreciated that a reference herein to any matter which is given as prior art is not to be taken as an admission that that matter was, in Australia or elsewhere, known or that the information it contains was part of the common general knowledge as at the priority date of the claims forming part of this specification.

SUMMARY OF INVENTION

With this in mind, one aspect of the present invention provides a method for estimating PCI and CQI of one or more data streams, each of the one or more data streams including a plurality of symbols, wherein the method includes:

(a) receiving a plurality of symbols from the one or more antennas;

(b) calculating average channel estimates of the plurality of symbols over a measurement period;

(c) forming a channel matrix from the averaged channel estimates;

(d) calculating a power ratio between a closed-loop mode and an open-loop mode for each PCI based on the channel matrix;

(e) calculating one or more Received Signal Code Power (RSCP) values and one or more Interference Signal Code Power (ISCP) values corresponding to the one or more transmit antennas;

(f) Averaging both the RSCP values and ISCP values over the one or more antennas to provide an averaged RSCP value and an averaged ISCP value;

(g) Calculating the open-loop SINR from the averaged RSCP and ISCP;

(h) Calculating the SINR for the one or more streams for each PCI from the power ratio and the open-loop SINR;

(i) determining the Transport Block Size (TBS) for a single stream from a single stream CQI table using calculated SINR;

(j) determining the TBS for all streams from a dual stream CQI table using calculated SINR;

(k) comparing the TBS of the single stream and total TBS of the dual stream to determine if the PCI is single stream or dual stream; and (l) determining PCI and CQI for the streams.

Advantageously, a simple and effective method of SINR estimation is provided based on estimation of power ratio between close-loop and open loop. In a further advantage, the SINR calculation can be used for all transmission modes.

The PCI is the index k of the weight $w_2(k)$; the 3GPP standard defines the weights $w_1$, $w_2(k)$, $w_3$, $w_4(k)$ as:

$$w_3 = w_1 = \frac{1}{\sqrt{2}}, w_4(k) = -w_2(k),$$

$$w_2(k) \in \left\{\frac{1+j}{2}, \frac{1-j}{2}, \frac{-1+j}{2}, \frac{-1-j}{2}\right\}.$$

Preferably, three RSCP values and three ISCP values corresponding to the one or more transmit antennas are generated.

Preferably, at step (b), the measurement period is determined by a period of N symbols which includes 2 slots of 10 symbols and A symbols of the other slots at either end of the slot such that N=20+2A.

Preferably, at step (b), calculating average channel estimates is determined by the expression:

$$h_{ab}(l) = \frac{1}{M} \sum_{i=m}^{m+M-1} \tilde{h}_{ab,i}(l)$$

$$a = 1, 2$$

$$b = 1, 2$$

$$l = 0, 1, \ldots, L-1$$

where $\tilde{h}_{ab,i}(l)$ is the i-th channel estimate of the a-th received antenna, b-th transmit antenna of l-th path and M is the symbols of the measurement period.

Preferably, at step (c), the channel matrix is:

$$H_1 = \begin{bmatrix} h_{11}(0), h_{11}(1), \ldots, h_{11}(L-1) \\ h_{12}(0), h_{12}(0), \ldots, h_{12}(L-1) \end{bmatrix},$$

$$H_2 = \begin{bmatrix} h_{21}(0), h_{21}(1), \ldots, h_{21}(L-1) \\ h_{22}(0), h_{22}(1), \ldots, h_{22}(L-1) \end{bmatrix}$$

Preferably, at step (d), the power ratio is calculated by the expression $$R_x(k) = \frac{w_1(k)(H_1 H_1^H + H_2 H_2^H) w_1(k)^H}{w_o(H_1 H_1^H + H_2 H_2^H) w_o^H}, k = 0, 1, 2, 3,$$

$$w_1(k) = [w_1 \ w_2(k)],$$

-continued $$w_o = \begin{bmatrix} \frac{1}{\sqrt{2}} & \frac{1}{\sqrt{2}} \end{bmatrix}.$$

Preferably, at step (h) the SINR for the one or more streams for each PCI is calculated by the expression:

$$SINR_x(k) = R_x(k) \times SINR_o, k=0, \ldots, 3$$

$$SINR_y(k) = SINR_x(3-k), k=0, \ldots, 3$$

Preferably, at step (i), the TBS is determined by the expression $$k_{x,max} = \underset{k}{\mathrm{argmax}} TBS_x(k).$$

Preferably, at step (j), the TBS is determined by the expression $$k_{xy,max} = \underset{k}{\mathrm{argmax}}(TBS_x(k) + TBS_y(k)).$$

Preferably, at step (k), whether the PCI is single stream or dual stream is determined by the expression if $TBS_x(k_{xy,max}) + TBS_y(k_{xy,max}) > TBS_x(k_{x,max})$: dual stream if $TBS_x(k_{xy,max}) + TBS_y(k_{xy,max}) \leq TBS_x(k_{x,max})$: single stream Preferably, at step (l), if the PCI is determined to be single stream, PCI=$k_{x,max}$ and CQI=CQI corresponding to $TBS_x(k_{x,max})$.

Alternatively, at step (l), if the PCI is determined to be dual stream PCI=$k_{xy,max}$ CQI-$x$=CQI corresponding to $TBS_x(k_{xy,max})$ CQI-$y$=CQI corresponding to $TBS_y(k_{xy,max})$.

Preferably, the three RSCP values are calculated by the expression:

$$RSCP_b(1) = \left| \frac{1}{\lambda} \left( \sum_{m=10-A}^{9} \frac{f_b(m, n-1)}{p_b(m, n-1)} + \sum_{m=0}^{\lambda-A-1} \frac{f_b(m, n)}{p_b(m, n)} \right) \right|^2,$$

$$RSCP_b(2) = \left| \frac{1}{\theta} \left( \sum_{m=10-\theta/2}^{9} \frac{f_b(m, n)}{p_b(m, n)} + \sum_{m=0}^{\theta/2-1} \frac{f_b(m, n+1)}{p_b(m, n+1)} \right) \right|^2,$$

$$RSCP_b(3) = \left| \frac{1}{\lambda} \left( \sum_{m=10-\lambda-A}^{9} \frac{f_b(m, n+1)}{p_b(m, n+1)} + \sum_{m=0}^{A-1} \frac{f_b(m, n+2)}{p_b(m, n+2)} \right) \right|^2,$$

$$b = 1, 2.$$

where $f_b(m, n)$ denotes the m-th symbol at the n-th slot of the b-th transmit antenna;
$p_b(m, n)$ denotes the pattern of $f_b(m, n)$;
$b=1, 2$;
$\lambda$ is the number of symbols used for calculation of $RSCP_b(1)$ and of $RSCP_b(3)$;
$\theta$ is number of symbols used for calculation of $RSCP_b(2)$, $$\theta = 2 \times \left\lceil \frac{\lambda}{2} \right\rceil \text{ where } \left\lceil \frac{\lambda}{2} \right\rceil$$

is the smallest integer such that $$\left\lceil \frac{\lambda}{2} \right\rceil \geq \frac{\lambda}{2}.$$

$p_b(m, n)$ is the original CPICH at the transmitter and $f_b(m, n)$ is the received CPICH at the receiver.

Preferably, the three ISCP values are calculated by the expression:

$$ISCP_b(1) = \frac{1}{\lambda} \left( \sum_{m=10-A}^{9} \left| \frac{f_b(m, n-1)}{p_b(m, n-1)} \right|^2 + \sum_{m=0}^{\lambda-A-1} \left| \frac{f_b(m, n)}{p_b(m, n)} \right|^2 \right) - RSCP_b(1),$$

$$ISCP_b(2) = \frac{1}{\theta} \left( \sum_{m=10-\theta/2}^{9} \left| \frac{f_b(m, n)}{p_b(m, n)} \right|^2 + \sum_{m=0}^{\theta/2-1} \left| \frac{f_b(m, n+1)}{p_b(m, n+1)} \right|^2 \right) - RSCP_b(2),$$

$$ISCP_b(3) = \frac{1}{\lambda} \left( \sum_{m=10-\lambda-A}^{9} \left| \frac{f_b(m, n+1)}{p_b(m, n+1)} \right|^2 + \sum_{m=0}^{A-1} \left| \frac{f_b(m, n+2)}{p_b(m, n+2)} \right|^2 \right) - RSCP_b(3),$$

$$b = 1, 2.$$

where $f_b(m, n)$ denotes the m-th symbol at the n-th slot of the b-th transmit antenna;
$p_b(m, n)$ denotes the pattern of $f_b(m, n)$;
$b=1, 2$;
$\lambda$ is the number of symbols used for calculation of $RSCP_b(1)$ and of $RSCP_b(3)$;
$\theta$ is number of symbols used for calculation of $RSCP_b(2)$, $$\theta = 2 \times \left\lceil \frac{\lambda}{2} \right\rceil \text{ where } \left\lceil \frac{\lambda}{2} \right\rceil$$

is the smallest integer such that $$\left\lceil \frac{\lambda}{2} \right\rceil \geq \frac{\lambda}{2}.$$

Preferably, the measurement period consists of the last A symbols of the (n−1)-th slot, the n-th slot, the (n+1)-th slot and the first A symbols of the (n+2)-th slot.

Preferably, A=5.

Preferably, at step (f) the RSCP and ISCP values are averaged by the expression:

$$RSCP = \sum_{b=1}^{2} \sum_{k=1}^{3} RSCP_b(k) \times g_{RSCP}(k)$$

$$ISCP = \sum_{b=1}^{2} \sum_{k=1}^{3} ISCP_b(k) \times g_{ISCP}(k);$$

where $g_{RSPC}(k)$ and $g_{RSCP}(k)$ are weighting coefficients.

Preferably, the weighting coefficients are given by $$g_{RSCP}(k)=[0,0,\tfrac{1}{2}]$$

$$g_{RSCP}(k)=[\tfrac{1}{6},\tfrac{1}{6},\tfrac{1}{6}]$$

In an alternative, if the measurement period starts with the slot number n=0, the RSCP and ISCP are determined by the expression:

$$RSCP_b(1) = \left| \sum_{m=0}^{\lambda-A-1} \frac{f_b(m,n)}{p_b(m,n)} \right|^2, \text{ and}$$

$$ISCP_b(1) = \left( \sum_{m=0}^{\lambda-A-1} \left| \frac{f_b(m,n)}{p_b(m,n)} \right|^2 \right) - RSCP_b(1)$$

Preferably, at step (h) the SINR is calculated by the expression $$SINR_o = \frac{RSCP}{ISCP}.$$

Alternatively, at step (h) the SINR is calculated by the expression $$SINR_o = \frac{2 \times RSCP_{current}}{ISCP_{current} + ISCP_{previous}},$$

where $RSCP_{current}$ and $RSCP_{previous}$ denote the RSCP calculated for the current measurement period and for the previous measurement period respectively; and $ISCP_{current}$ and $ISCP_{previous}$ denote the ISCP calculated for the current measurement period and for the previous measurement period respectively.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

DESCRIPTION OF EMBODIMENTS

Figure 1:
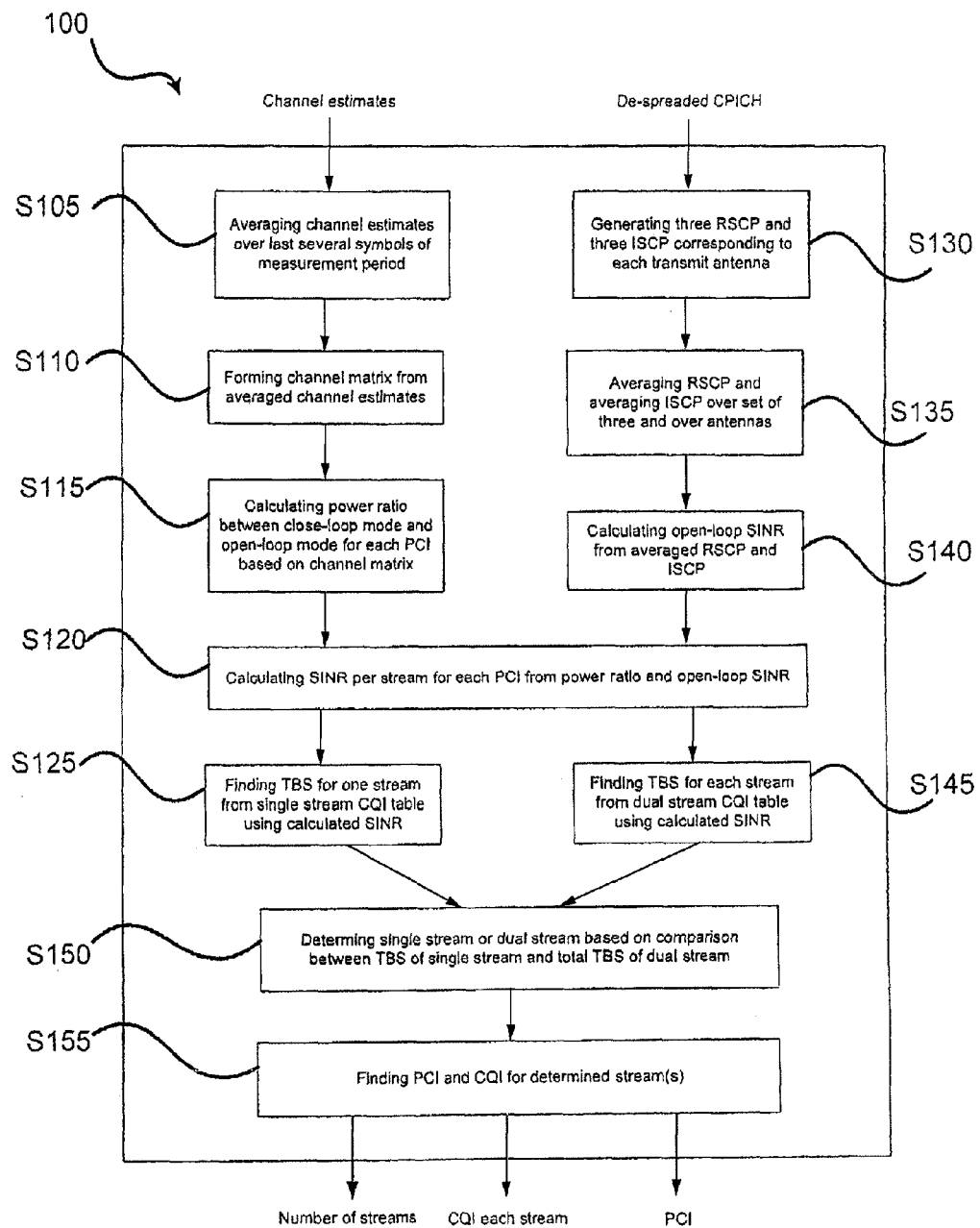
FIG. 1 is a flow diagram of the method of the present invention.

Referring now to FIG. 1, there is shown a method for estimating PCI and CQI of one or more data streams. The method is based on estimation of the ratio of signal power between the closed-loop and the open-loop. The method 100 takes the input of channel estimates to calculate the power ratio in steps 105 to 115 and takes the input of de-spreaded Common Pilot Channel (CPICH) to calculate the open-loop SINR as shown in steps 130 through to 140. As an example, if the measurement period is L=100 symbols, indexed 0, . . . 99, then the last M=5 symbols indexed 95, 96, 97, 98, 99 may be used. More detail with regard to the measurement period is provided below:

Control then moves to step 110 in which a channel matrix is formed from the average channel estimates in step 105. The average of the channel estimate over the last M symbols of the measurement period is calculated by $$h_{ab}(l) = \frac{1}{M} \sum_{i=m}^{m+M-1} \tilde{h}_{ab,i}(l)$$

$$a = 1, 2$$
$$b = 1, 2$$
$$l = 0, 1, \ldots, L-1$$

where $\tilde{h}_{ab,i}(l)$ is the i-th channel estimate of the a-th received antenna, b-th transmit antenna of l-th path. The channel matrices are given by:

$$H_1 = \begin{bmatrix} h_{11}(0), h_{11}(1), \ldots, h_{11}(L-1) \\ h_{12}(0), h_{12}(0), \ldots, h_{12}(L-1) \end{bmatrix},$$

$$H_2 = \begin{bmatrix} h_{21}(0), h_{21}(1), \ldots, h_{21}(L-1) \\ h_{22}(0), h_{22}(1), \ldots, h_{22}(L-1) \end{bmatrix}$$

Once the channel matrix is determined, control moves to step 115, where for each PCI (i.e. for each $w_2(k)$) a power ratio between the closed-loop mode and the open-loop mode is calculated according to the expression:

$$R_x(k) = \frac{w_1(k)(H_1 H_1^H + H_2 H_2^H) w_1(k)^H}{w_o(H_1 H_1^H + H_2 H_2^H) w_o^H}, k = 0, \ldots, 3.$$

Step 120 calculates the SINR per stream for each PCI from the power ratio calculated in Step 115 and the open-loop SINR calculated in Step 140 according to the expression:

$$SINR_x(k) = R_x(k) \times SINR_o, k = 0, \ldots, 3$$

$$SINR_y(k) = SINR_x(3-k), k = 0, \ldots, 3$$

At step 130 one or more Received Signal Code Power (RSCP) values and one or more Interference Signal Code Power (ISCP) values corresponding to the one or more transmit antennas is calculated. Preferably, three RSCP and three ISCP are generated for each transmit antenna. In practice, three RSCP and three ISCP has been found to provide a good result, but more or less than three RSCP and ISCP can be used.

The three RSCP values and three ISCP values for each transmitter are determined by the following expressions:

$$RSCP_b(1) = \left| \frac{1}{\lambda} \left( \sum_{m=10-A}^{9} \frac{f_b(m, n-1)}{p_b(m, n-1)} + \sum_{m=0}^{\lambda-A-1} \frac{f_b(m, n)}{p_b(m, n)} \right) \right|^2,$$

$$RSCP_b(2) = \left| \frac{1}{\theta} \left( \sum_{m=10-\theta/2}^{9} \frac{f_b(m, n)}{p_b(m, n)} + \sum_{m=0}^{\theta/2-1} \frac{f_b(m, n+1)}{p_b(m, n+1)} \right) \right|^2,$$

$$RSCP_b(3) = \left| \frac{1}{\lambda} \left( \sum_{m=10-\lambda-A}^{9} \frac{f_b(m, n+1)}{p_b(m, n+1)} + \sum_{m=0}^{A-1} \frac{f_b(m, n+2)}{p_b(m, n+2)} \right) \right|^2,$$

$$ISCP_b(1) = \frac{1}{\lambda} \left( \sum_{m=10-A}^{9} \left| \frac{f_b(m, n-1)}{p_b(m, n-1)} \right|^2 + \sum_{m=0}^{\lambda-A-1} \left| \frac{f_b(m, n)}{p_b(m, n)} \right|^2 \right) - RSCP_b(1),$$

$$ISCP_b(2) = \frac{1}{\theta} \left( \sum_{m=10-\theta/2}^{9} \left| \frac{f_b(m, n)}{p_b(m, n)} \right|^2 + \sum_{m=0}^{\theta/2-1} \left| \frac{f_b(m, n+1)}{p_b(m, n+1)} \right|^2 \right) - RSCP_b(2),$$

$$ISCP_b(3) =$$
$$\frac{1}{\lambda} \left( \sum_{m=10-\lambda-A}^{9} \left| \frac{f_b(m, n+1)}{p_b(m, n+1)} \right|^2 + \sum_{m=0}^{A-1} \left| \frac{f_b(m, n+2)}{p_b(m, n+2)} \right|^2 \right) - RSCP_b(3),$$

$$b = 1, 2.$$

Where $f_b(m, n)$ denotes the m-th CPICH symbol at the n-th slot of the b-th TX (the outputs of the CPICH de-spreader); and $p_b(m,n)$ denote the pattern of $f_b(m,n)$. $p_b(m,n)$ is the original CPICH at the transmitter and $f_b(m, n)$ is the received CPICH at the receiver.

An assumption is made that the measurement period consists of the last A symbols of the (n−1)-th slot, the n-th slot, the (n+1)-th slot and the first A symbols of the (n+2)-th slot, where λ is the number of CPICH symbols used for calculation of $RSCP_b(1)$ and of $RSCP_b(3)$ ; θ is number of CPICH symbols used for calculation of $RSCP_b(2)$;

$$\theta = 2 \times \left\lceil \frac{\lambda}{2} \right\rceil \text{ where } \left\lceil \frac{\lambda}{2} \right\rceil$$

is the smallest integer and $$\left\lceil \frac{\lambda}{2} \right\rceil \geq \frac{\lambda}{2}.$$

Preferably, for simplicity, it is recommended that A=5 since empirically this value has been found to provide a good result.

In an alternative at step 120, if the measurement period starts with the slot number n=0, the RSCP and ISCP are determined by the expression:

$$RSCP_b(1) = \left| \sum_{m=0}^{\lambda-A-1} \frac{f_b(m, n)}{p_b(m, n)} \right|^2,$$

and $$ISCP_b(1) = \left( \sum_{m=0}^{\lambda-A-1} \left| \frac{f_b(m, n)}{p_b(m, n)} \right|^2 \right) - RSCP_b(1)$$

Control then moves to step 135 where both the RSCP values and ISCP values over the one or more antennas are averaged to provide an averaged RSCP value and an averaged ISCP value. The averaging is determined by the expression:

$$RSCP = \sum_{b=1}^{2} \sum_{k=1}^{3} RSCP_b(k) \times g_{RSCP}(k)$$

$$ISCP = \sum_{b=1}^{2} \sum_{k=1}^{3} ISCP_b(k) \times g_{ISCP}(k).$$

Where $g_{RSCP}(k)$ and $g_{RSCP}(k)$ are the weighting coefficients. Preferably, the values of the weighting coefficients are:

$$g_{RSCP}(k) = [0, 0, \frac{1}{2}]$$

$$g_{ISCP}(k) = [\frac{1}{6}, \frac{1}{6}, \frac{1}{6}]$$

The above weighing coefficients have been selected on the basis of a desire to use the last calculated RSCP value so that [0, 0, ½] is used. The value of ½ is derived from the sum of RSCP on 2 antennas so for averaging it needs to be divided by 2. Further, the weighing coefficients have been selected on the basis of a desire to use all calculated ISCP so that [⅙, ⅙, ⅙] is used. The value of ⅙ comes from the sum of ISCP on 2 antennas and 3 slots (k=1,2,3), i.e. the summation is over 6 values. So for averaging, this value needs to be divided by 6.

Control then moves to step 140 where the open-loop SINR is calculated from the averaged RSCP and ISCP determined at step 135. The SINR is calculated by the expression $$SINR_o = \frac{RSCP}{ISCP}.$$

Alternatively, the SINR may be calculated by the expression $$SINR_o = \frac{2 \times RSCP_{current}}{ISCP_{current} + ISCP_{previous}},$$

where $RSCP_{current}$ and $RSCP_{previous}$ denote the RSCP calculated for the current measurement period and for the previous measurement period respectively; and $ISCP_{current}$ and $ISCP_{previous}$ denote the ISCP calculated for the current measurement period and for the previous measurement period respectively. Advantageously, the second method may improve calculated results if the channel does not change quickly.

Control then moves to step 120 which requires the power ratio as determined at step 115 and the open-loop SINR as determined at step 140. At step 120 the SINR is calculated for each stream for each PCI from the power ratio and the open-loop SINR ($SINR_x(k)$, $SINR_y(k)$). This is determined by the expression:

$$SINR_x(k) = R_x(k) \times SINR_o, \ k=0, \ldots, 3$$

$$SINR_y(k) = SINR_x(3-k), \ k=0, \ldots, 3$$

Control then moves to step 125 where the closed-loop mode the Transport Block Size (TBS) is determined for a single stream via a single stream CQI table using the calculated SINR as determined at step 120. $TBS_x(k)$ is found from the CQI table for single stream mapping scheme, then $$k_{x,max} = \underset{k}{\operatorname{argmax}} TBS_x(k)$$

Further, from step 120 control also moves to step 145 where the closed-loop mode the transport block size (TBS) for each stream from a dual stream CQI table is calculated using the calculated SINR as determined at step 120. $TBS_x(k)$ and $TBS_x(k)$ is found from the CQI table for dual stream mapping scheme, then $$k_{xy,max} = \underset{k}{\mathrm{argmax}}(TBS_x(k) + TBS_y(k)).$$

The outputs of steps 125 and step 145 are then fed into step 150, where a comparison of the TBS of the single stream (step 125) and the total TBS of the dual stream (step 145) is compared to determine if single stream or dual stream is selected. In particular this is determined by the expression:

if $TBS_x(k_{xy,\,max}) + TBS_x(k_{xy,max}) > TBS_x(k_{x,max})$: dual stream if $TBS_x(k_{xy,max}) + TBS_y(k_{xy,max}) \leq TBS_x(k_{x,max})$: single stream In the event that step 150 it is determined that the PCI is a single stream, then at step 155:

$PCI = k_{x,max}$ $CQI = CQI$ corresponding to $TBS_x(k_{x,max})$

Alternatively, if it is found at step 150 that the PCI is dual stream, the output at step 155 is $PCI = k_{x,max}$ $CQI\text{-}x = CQI$ corresponding to $TBS_x(k_{xy,max})$ $CQI\text{-}y = CQI$ corresponding to $TBS_x(k_{xy,max})$ Finally, at step 155 the method outputs the number of streams the CQI estimated for each stream and the PCI. Advantageously the method of determining the closed-loop PCI and CQI calculation is mathematically derived. Further, the method for open-loop SINR calculation can be used for all transmission modes.

Figure 2:
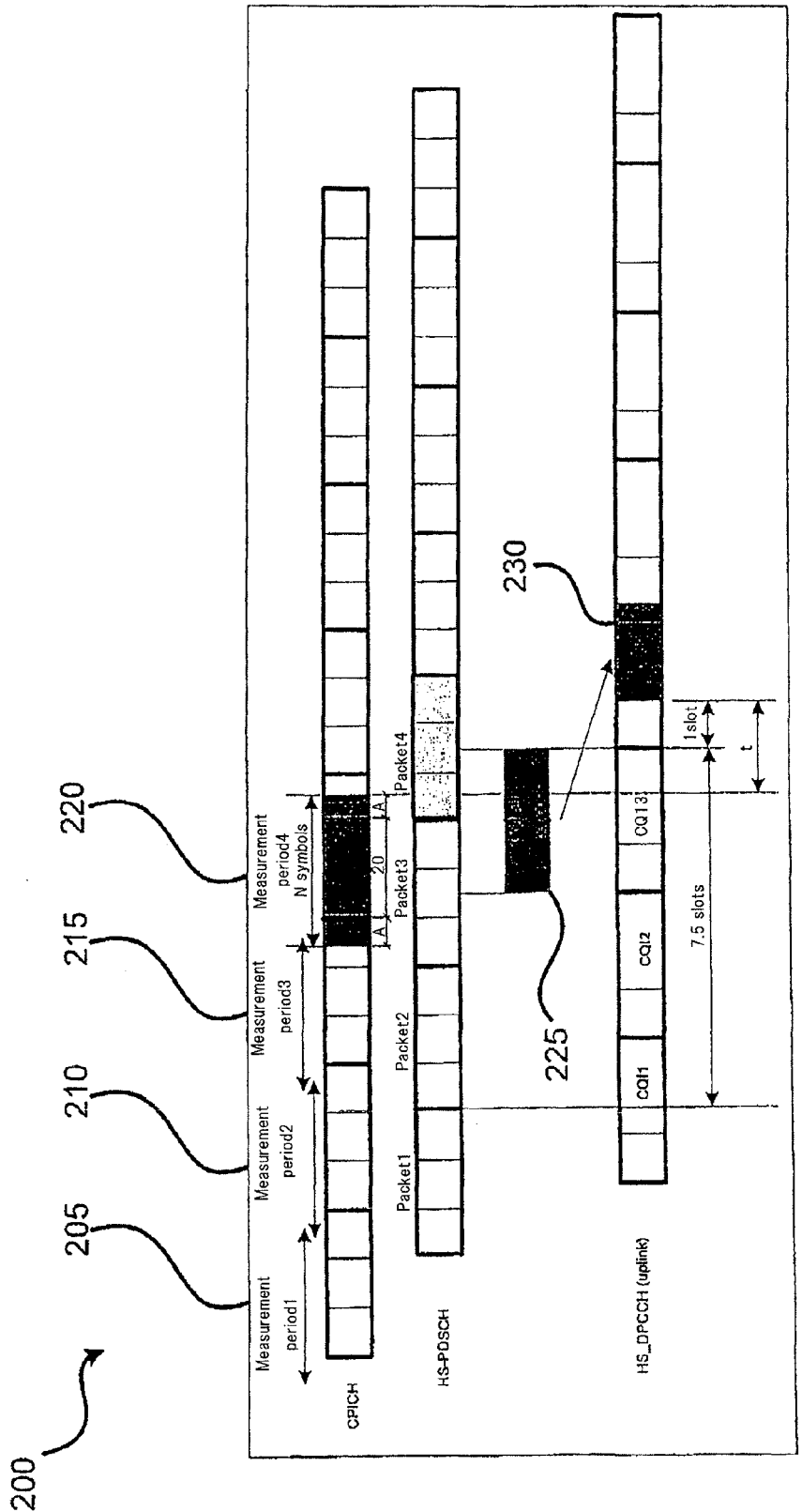
FIG. 2 is a schematic diagram of the timing of the measurement period.

FIG. 2 illustrates in more detail the measurement timing involved with the measurement period as detailed in the diagram 100 of the method of the invention, and in particular the timing alignment between measurement period, CQI reference period and CQI period.

FIG. 2 shows a timing diagram 200 which includes a common pilot channel (CPICH), a high speed physical downlink shared channel (HS-PDSCH) and the high speed physical downlink shared channel uplink (HS-PDSCH (uplink). Each of the CPICH, HS-PDSCH and HSDPCCH (uplink) include a number of measurement periods 205, 210, 215 and 220. For ease of reference, only measurement period 220 will be described in detail. Measurement period 220 on the CPICH has an offset t which is the difference between the end of the measurement period 220 and the uplink CQI transmission slot (HSDPCCH Uplink). Measurement period 220 includes N symbols which includes two slots of 10 symbols in the centre and A symbols of the other slots at the two ends such that N=20+2A.

In order for the base-station to apply a CQI value on packet number 4 then the CQI must be sent through the uplink during the CQI4 period 230. In order to send during this period, the CQI value must be calculated during the CQI reference period 225. As a result, the CQI calculation must use the SINR measured during the measurement period 4 (220).

Figure 3:
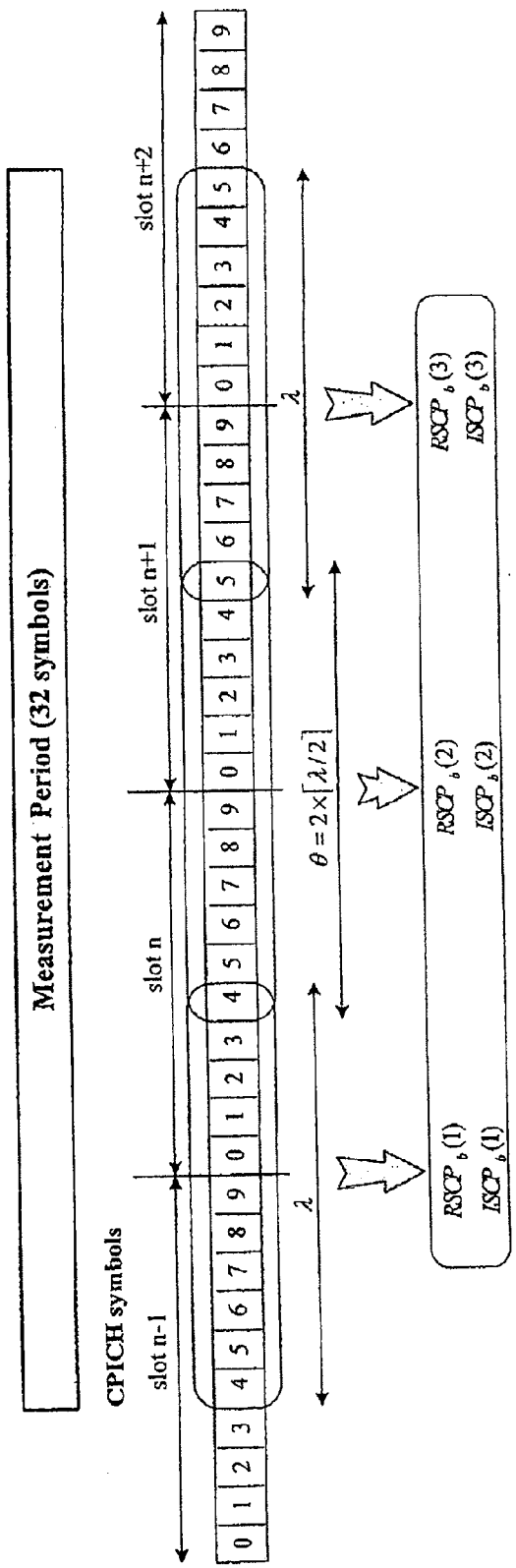
FIG. 3 is a schematic diagram of a measurement period.

FIG. 3 shows another timing diagram which includes a measurement period of 32 symbols used in step 135 of the method of the invention. In particular, FIG. 3 illustrates how the received signals during a measurement period are used in calculation of RSCP and ISCP. The measurement period consists of 32 symbols. It starts from middle of slot n−1 and ends at the middle of the slot n+2. The symbols are divided into 3 overlap groups. The first and the last group have the same number of symbols. The second group may have different number of symbols.

The method 100 is carried out by a system, for example, by a CDMA based system 100 that receives a plurality of symbols from one or more transmit antennas.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

The invention claimed is:

1. A method of estimating PCI and CQI of one or more data streams, each of the one or more data streams including a plurality of symbols, wherein the method includes:
   (a) receiving a plurality of symbols from the one or more transmit antennas;
   (b) calculating average channel estimates of the plurality of symbols over a measurement period;
   (c) forming a channel matrix from the averaged channel estimates;
   (d) calculating a power ratio between a closed-loop mode and an open-loop mode for each PCI based on the channel matrix;
   (e) calculating one or more Received Signal Code Power (RSCP) values and one or more Interference Signal Code Power (ISCP) values corresponding to the one or more transmit antennas, wherein three RSCP values and three ISCP values corresponding to the one or more transmit antennas are generated;
   (f) averaging both the RSCP values and ISCP values over the one or more antennas to provide an averaged RSCP value and an averaged ISCP value;
   (g) calculating the open-loop SINR from the averaged RSCP and ISCP;
   (h) calculating the SINR for the one or more streams for each PCI from the power ratio and the open-loop SINR;
   (i) determining the Transport Block Size (TBS) for a single stream from a single stream CQI table using calculated SINR;
   (j) determining the TBS for all streams from a dual stream CQI table using calculated SINR;
   (k) comparing the TBS of the single stream and total TBS of the dual stream to determine if single stream or dual stream should be selected; and
   (l) determining PCI and CQI for the stream(s),
   wherein the three RSCP values are calculated by the expression:

$$RSCP_b(1) = \left| \frac{1}{\lambda} \left( \sum_{m=10-A}^{9} \frac{f_b(m, n-1)}{p_b(m, n-1)} + \sum_{m=0}^{\lambda-A-1} \frac{f_b(m, n)}{p_b(m, n)} \right) \right|^2,$$

$$RSCP_b(2) = \left| \frac{1}{\theta} \left( \sum_{m=10-\theta/2}^{9} \frac{f_b(m, n)}{p_b(m, n)} + \sum_{m=0}^{\theta/2-1} \frac{f_b(m, n+1)}{p_b(m, n+1)} \right) \right|^2,$$

-continued $$RSCP_b(3) = \left| \frac{1}{\lambda} \left( \sum_{m=10-\lambda-A}^{9} \frac{f_b(m, n+1)}{p_b(m, n+1)} + \sum_{m=0}^{A-1} \frac{f_b(m, n+2)}{p_b(m, n+2)} \right) \right|^2,$$

$$b = 1, 2$$

where $f_b(m, n)$ denotes the m-th symbol at the n-th slot of the b-th transmit antenna;
$p_b(m, n)$ denotes the pattern of $f_b(m,n)$;
b=1, 2;
$\lambda$ is the number of symbols used for calculation of $RSCP_b(1)$ and of $RSCP_b(3)$;
$\theta$ is number of symbols used for calculation of $RSCP_b(2)$, $$\theta = 2 \times \left\lceil \frac{\lambda}{2} \right\rceil \text{ where } \left\lceil \frac{\lambda}{2} \right\rceil$$

is the smallest integer such that $$\left\lceil \frac{\lambda}{2} \right\rceil \geq \frac{\lambda}{2}.$$

2. A method of estimating PCI and CQI of one or more data streams, each of the one or more data streams including a plurality symbols, wherein the method includes:
(a) receiving a plurality of symbols from the one or more transmit antennas;
(b) calculating average channel estimates of the plurality of symbols over a measurement period;
(c) forming a channel matrix from the averaged channel estimates;
(d) calculating a power ratio between a closed-loop mode and an open-loop mode for each PCI based on the channel matrix;
(e) calculating one or more Received Signal Code Power (RSCP) values and one or more Interference Signal Code Power (ISCP) values corresponding to the one or more transmit antennas, wherein three RSCP values and three ISCP values corresponding to the one or more transmit antennas are generated;
(f) averaging both the RSCP values and ISCP values over the one or more antennas to provide an averaged RSCP value and an averaged ISCP value;
(g) calculating the open-loop SINR from the averaged RSCP and ISCP;
(h) calculating the SINR for the one or more streams for each PCI from the power ratio and the open-loop SINR;
(i) determining the Transport Block Size (TBS) for a single stream from a single stream CQI table using calculated SINR;
(j) determining the TBS for all streams from a dual stream CQI table using calculated SINR;
(k) comparing the TBS of the single stream and total TBS of the dual stream to determine if single stream or dual stream should be selected; and
(l) determining PCI and CQI for the stream(s), wherein the three ISCP values are calculated by the expression:

$$ISCP_b(1) = \frac{1}{\lambda} \left( \sum_{m=10-A}^{9} \left| \frac{f_b(m, n-1)}{p_b(m, n-1)} \right|^2 + \sum_{m=0}^{\lambda-A-1} \left| \frac{f_b(m, n)}{p_b(m, n)} \right|^2 \right) - RSCP_b(1),$$

$$ISCP_b(2) = \frac{1}{\theta} \left( \sum_{m=10-\theta/2}^{9} \left| \frac{f_b(m, n)}{p_b(m, n)} \right|^2 + \sum_{m=0}^{\theta/2-1} \left| \frac{f_b(m, n+1)}{p_b(m, n+1)} \right|^2 \right) - RSCP_b(2),$$

$$ISCP_b(3) =$$

$$\frac{1}{\lambda} \left( \sum_{m=10-\lambda-A}^{9} \left| \frac{f_b(m, n+1)}{p_b(m, n+1)} \right|^2 + \sum_{m=0}^{A-1} \left| \frac{f_b(m, n+2)}{p_b(m, n+2)} \right|^2 \right) - RSCP_b(3),$$

$$b = 1, 2$$

where $f_b(m,n)$ denotes the m-th symbol at the n-th slot of the b-th transmit antenna;
$p_b(m,n)$ denotes the pattern of $f_b(m,n)$;
b=1, 2;
$\lambda$ is the number of symbols used for calculation of $RSCP_b(1)$ and of $RSCP_b(3)$;
$\theta$ is number of symbols used for calculation of $RSCP_b(2)$, $$\theta = 2 \times \left\lceil \frac{\lambda}{2} \right\rceil \text{ where } \left\lceil \frac{\lambda}{2} \right\rceil$$

is the smallest integer such that $$\left\lceil \frac{\lambda}{2} \right\rceil \geq \frac{\lambda}{2}.$$

3. A method of estimating PCI and CQI of one or more data streams, each of the one or more data streams including a plurality of symbols, wherein the method includes:
(a) receiving a plurality of symbols from the one or more transmit antennas;
(b) calculating average channel estimates of the plurality of symbols over a measurement period;
(c) forming a channel matrix from the averaged channel estimates;
(d) calculating a power ratio between a closed-loop mode and an open-loop mode for each PCI based on the channel matrix;
(e) calculating one or more Received Signal Code Power (RSCP) values and one or more Interference Signal Code Power (ISCP) values corresponding to the one or more transmit antennas;
(f) averaging both the RSCP values and ISCP values over the one or more antennas to provide an averaged RSCP value and an averaged ISCP value;
(g) calculating the open-loop SINR from the averaged RSCP and ISCP;
(h) calculating the SINR for the one or more streams for each PCI from the power ratio and the open-loop SINR;
(i) determining the Transport Block Size (TBS) for a single stream from a single stream CQI table using calculated SINR;
(j) determining the TBS for all streams from a dual stream CQI table using calculated SINR;
(k) comparing the TBS of the single stream and total TBS of the dual stream to determine if single stream or dual stream should be selected; and
(l) determining PCI and CQI for the stream(s), wherein at calculating the open-loop SINR, the SINR is calculated by the expression $$SINR_o = \frac{2 \times RSCP_{current}}{ISCP_{current} + ISCP_{previous}},$$

where $RSCP_{current}$ and $RSCP_{previous}$ denote the RSCP calculated for the current measurement period and for the previous measurement period respectively; and $ISCP_{current}$ and $ISCP_{previous}$ denote the ISCP calculated for the current measurement period and for the previous measurement period respectively.

4. An apparatus that estimates PCI and CQI of one or more data streams, each of the one or more data streams including a plurality of symbols, wherein the apparatus includes:
  (a) a receiving unit receiving a plurality of symbols from the one or more transmit antennas;
  (b) a first calculating unit calculating average channel estimates of the plurality of symbols over a measurement period;
  (c) a forming unit forming a channel matrix from the averaged channel estimates;
  (d) a second calculating unit calculating a power ratio between a closed-loop mode and an open-loop mode for each PCI based on the channel matrix;
  (e) a third calculating unit calculating one or more Received Signal Code Power (RSCP) values and one or more Interference Signal Code Power (ISCP) values corresponding to the one or more transmit antennas, wherein three RSCP values and three ISCP values corresponding to the one or more transmit antennas are generated;
  (f) an averaging unit averaging both the RSCP values and ISCP values over the one or more antennas to provide an averaged RSCP value and an averaged ISCP value;
  (g) a forth calculating unit calculating the open-loop SINR from the averaged RSCP and ISCP;
  (h) a fifth calculating unit calculating the SINR for the one or more streams for each PCI from the power ratio and the open-loop SINR;
  (i) a first determining unit determining the Transport Block Size (TBS) for a single stream from a single stream CQI table using calculated SINR;
  (j) a second determining unit determining the TBS for all streams from a dual stream CQI table using calculated SINR;
  (k) a comparing unit comparing the TBS of the single stream and total TBS of the dual stream to determine if single stream or dual stream should be selected; and
  (l) a third determining unit determining PCI and CQI for the streams, wherein the three RSCP values are calculated by the expression:

$$RSCP_b(1) = \left| \frac{1}{\lambda} \left( \sum_{m=10-A}^{9} \frac{f_b(m, n-1)}{p_b(m, n-1)} + \sum_{m=0}^{\lambda-A-1} \frac{f_b(m, n)}{p_b(m, n)} \right) \right|^2,$$

$$RSCP_b(2) = \left| \frac{1}{\theta} \left( \sum_{m=10-\theta/2}^{9} \frac{f_b(m, n)}{p_b(m, n)} + \sum_{m=0}^{\theta/2-1} \frac{f_b(m, n+1)}{p_b(m, n+1)} \right) \right|^2,$$

$$RSCP_b(3) = \left| \frac{1}{\lambda} \left( \sum_{m=10-\lambda-A}^{9} \frac{f_b(m, n+1)}{p_b(m, n+1)} + \sum_{m=0}^{A-1} \frac{f_b(m, n+2)}{p_b(m, n+2)} \right) \right|^2,$$

$$b = 1, 2$$

where $f_b(m,n)$ denotes the m-th symbol at the n-th slot of the b-th transmit antenna;

$p_b(m,n)$ denotes the pattern of $f_b(m,n)$;
b=1, 2;
$\lambda$ is the number of symbols used for calculation of $RSCP_b(1)$ and of $RSCP_b(3)$;
$\theta$ is number of symbols used for calculation of $RSCP_b(2)$, $$\theta = 2 \times \left\lceil \frac{\lambda}{2} \right\rceil \text{ where } \left\lceil \frac{\lambda}{2} \right\rceil$$

is the smallest integer such that $$\left\lceil \frac{\lambda}{2} \right\rceil \geq \frac{\lambda}{2}.$$

5. An apparatus that estimates PCI and CQI of one or more data streams, each of the one or more data streams including a plurality of symbols, wherein the apparatus includes:
  (a) a receiving unit receiving a plurality of symbols from the one or more transmit antennas;
  (b) a first calculating unit calculating average channel estimates of the plurality of symbols over a measurement period;
  (c) a forming unit forming a channel matrix from the averaged channel estimates;
  (d) a second calculating unit calculating a power ratio between a closed-loop mode and an open-loop mode for each PCI based on the channel matrix;
  (e) a third calculating unit calculating one or more Received Signal Code Power (RSCP) values and one or more Interference Signal Code Power (ISCP) values corresponding to the one or more transmit antennas, wherein three RSCP values and three ISCP values corresponding to the one or more transmit antennas are generated;
  (f) an averaging unit averaging both the RSCP values and ISCP values over the one or more antennas to provide an averaged RSCP value and an averaged ISCP value;
  (g) a forth calculating unit calculating the open-loop SINR from the averaged RSCP and ISCP;
  (h) a fifth calculating unit calculating the SINR for the one or more streams for each PCI from the power ratio and the open-loop SINR;
  (i) a first determining unit determining the Transport Block Size (TBS) for a single stream from a single stream CQI table using calculated SINR;
  (j) a second determining unit determining the TBS for all streams from a dual stream CQI table using calculated SINR;
  (k) a comparing unit comparing the TBS of the single stream and total TBS of the dual stream to determine if single stream or dual stream should be selected; and
  (l) a third determining unit determining PCI and CQI for the stream(s), wherein the three ISCP values are calculated by the expression:

$$ISCP_b(1) = \frac{1}{\lambda} \left( \sum_{m=10-A}^{9} \left| \frac{f_b(m, n-1)}{p_b(m, n-1)} \right|^2 + \sum_{m=0}^{\lambda-A-1} \left| \frac{f_b(m, n)}{p_b(m, n)} \right|^2 \right) - RSCP_b(1),$$

$$ISCP_b(2) = \frac{1}{\theta} \left( \sum_{m=10-\theta/2}^{9} \left| \frac{f_b(m, n)}{p_b(m, n)} \right|^2 + \sum_{m=0}^{\theta/2-1} \left| \frac{f_b(m, n+1)}{p_b(m, n+1)} \right|^2 \right) - RSCP_b(2),$$

-continued $$ISCP_b(3) = \frac{1}{\lambda}\left(\sum_{m=10-\lambda-A}^{9}\left|\frac{f_b(m,n+1)}{p_b(m,n+1)}\right|^2 + \sum_{m=0}^{A-1}\left|\frac{f_b(m,n+2)}{p_b(m,n+2)}\right|^2\right) - RSCP_b(3),$$

$$b = 1, 2$$

where $f_b(m, n)$ denotes the m-th symbol at the n-th slot of the b-th transmit antenna;
$p_b(m, n)$ denotes the pattern of $f_b(m, n)$;
b=1, 2;
λ is the number of symbols used for calculation of $RSCP_b(1)$ and of $RSCP_b(3)$;
θ is number of symbols used for calculation of $RSCP_b(2)$, $$\theta = 2 \times \left\lceil\frac{\lambda}{2}\right\rceil \text{ where } \left\lceil\frac{\lambda}{2}\right\rceil$$

is the smallest integer such that $$\left\lceil\frac{\lambda}{2}\right\rceil \geq \frac{\lambda}{2}.$$

6. An apparatus that estimates PCI and CQI of one or more data streams, each of the one or more data streams including a plurality of symbols, wherein the apparatus includes:
(a) a receiving unit receiving a plurality of symbols from the one or more transmit antennas;
(b) a first calculating unit calculating average channel estimates of the plurality of symbols over a measurement period;
(c) a forming unit forming a channel matrix from the averaged channel estimates;
(d) a second calculating unit calculating a power ratio between a closed-loop mode and an open-loop mode for each PCI based on the channel matrix;
(e) a third calculating unit calculating one or more Received Signal Code Power (RSCP) values and one or more Interference Signal Code Power (ISCP) values corresponding to the one or more transmit antennas;
(f) an averaging unit averaging both the RSCP values and ISCP values over the one or more antennas to provide an averaged RSCP value and an averaged ISCP value;
(g) a forth calculating unit calculating the open-loop SINR from the averaged RSCP and ISCP;
(h) a fifth calculating unit calculating the SINR for the one or more streams for each PCI from the power ratio and the open-loop SINR;
(i) a first determining unit determining the Transport Block Size (TBS) for a single stream from a single stream CQI table using calculated SINR;
(j) a second determining unit determining the TBS for all streams from a dual stream CQI table using calculated SINR;
(k) a comparing unit comparing the TBS of the single stream and total TBS of the dual stream to determine if single stream or dual stream should be selected; and
(l) a third determining unit determining PCI and CQI for the stream(s), wherein at calculating the open-loop SINR, the SINR is calculated by the expression $$SINR_o = \frac{2 \times RSCP_{current}}{ISCP_{current} + ISCP_{previous}},$$

where $RSCP_{current}$ and $RSCP_{previous}$ denote the RSCP calculated for the current measurement period and for the previous measurement period respectively; and $ISCP_{current}$ and $ISCP_{previous}$ denote the ISCP calculated for the current measurement period and for the previous measurement period respectively.

\* \* \* \* \*

UNITED STATES PATENT AND TRADEMARK OFFICE
CERTIFICATE OF CORRECTION

PATENT NO. : 8,767,579 B2  
APPLICATION NO. : 13/383544  
DATED : July 1, 2014  
INVENTOR(S) : Duong Pham Page 1 of 1

It is certified that error appears in the above-identified patent and that said Letters Patent is hereby corrected as shown below:

In the Specification

Column 4, Line 67: Delete "$g_{RSPC}$" and insert -- $g_{RSCP}$ --

Column 4, Line 67: Delete "$g_{RSCP}$" and insert -- $g_{ISCP}$ --

Column 5, Line 5: Delete "$g_{RSCP}(k)=[1/6,1/6,1/6]$" and insert -- $g_{ISCP}(k)=[1/6,1/6,1/6]$. --

Column 8, Line 9: Delete "$g_{RSCP}$" and insert -- $g_{ISCP}$ --

Column 8, Line 56: Delete "$SINR_x(k)$" and insert -- $SINR_y(k)$ --

Column 9, Line 5: Delete "$TBS_x(k)$" and insert -- $TBS_y(k)$ --

Column 9, Line 17: Delete "$TBS_x$" and insert -- $TBS_y$ --

Column 9, Line 32: Delete "$k_{x,max}$" and insert -- $k_{xy,max}$ --

Column 9, Line 36: Delete "$TBS_x$" and insert -- $TBS_y$ --

Signed and Sealed this  
Third Day of February, 2015

Michelle K. Lee  
*Deputy Director of the United States Patent and Trademark Office*